United States Patent
Vendrow et al.

(10) Patent No.: US 9,710,142 B1
(45) Date of Patent: Jul. 18, 2017

(54) SYSTEM AND METHOD FOR DYNAMIC USER INTERFACE GAMIFICATION IN CONFERENCE CALLS

(71) Applicant: RingCentral, Inc., Belmont, CA (US)

(72) Inventors: Vlad Vendrow, Redwood City, CA (US); Christopher Van Rensburg, Foster City, CA (US); Aleksei Petrov, Redwood City, CA (US); Dmitriy Solovey, San Jose, CA (US)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 15/017,309

(22) Filed: Feb. 5, 2016

(51) Int. Cl.
| | |
|---|---|
| G06F 3/0484 | (2013.01) |
| H04L 29/06 | (2006.01) |
| H04L 29/08 | (2006.01) |
| G06F 3/01 | (2006.01) |
| G06F 3/0482 | (2013.01) |
| G06F 17/27 | (2006.01) |

(52) U.S. Cl.
CPC .......... *G06F 3/04845* (2013.01); *G06F 3/015* (2013.01); *G06F 3/0482* (2013.01); *G06F 17/27* (2013.01); *H04L 65/403* (2013.01); *H04L 67/02* (2013.01)

(58) Field of Classification Search
CPC .... G06F 3/04845; G06F 3/015; G06F 3/0482; G06F 17/27; H04L 65/403; H04L 67/02
See application file for complete search history.

(56) References Cited

U.S. PATENT DOCUMENTS

| | | | | |
|---|---|---|---|---|
| 6,453,336 B1 * | 9/2002 | Beyda | ..................... | H04L 29/06 709/204 |
| 7,124,372 B2 * | 10/2006 | Brin | ..................... | H04L 12/1822 715/751 |
| 7,240,100 B1 * | 7/2007 | Wein | ..................... | H04L 67/1008 709/214 |
| 7,290,056 B1 * | 10/2007 | McLaughlin, Jr. | . | H04L 43/0852 709/201 |
| 7,768,543 B2 * | 8/2010 | Christiansen | ..... | H04L 29/06027 348/14.08 |
| 7,809,792 B2 * | 10/2010 | Hirata | ............... | G06F 17/30787 709/205 |
| 7,881,780 B2 * | 2/2011 | Flaherty | ..................... | A61F 2/50 600/544 |

(Continued)

*Primary Examiner* — Jung-Mu Chuang
(74) *Attorney, Agent, or Firm* — Finnegan, Henderson, Farabow, Garrett & Dunner LLP

(57) ABSTRACT

A computer-implemented method for dynamically changing a conference graphical user interface is provided. The method includes providing a graphical user interface representative of a conference in an online environment to a plurality of participants in the conference, wherein the graphical user interface includes representations of the plurality of participants, and the representations are based on scores associated with the plurality of participants. The method further includes acquiring data from one or more of the plurality of participants representative of a participation level of a participant of the plurality of participants and updating the score associated with the participant using the acquired data. Moreover, the method includes determining changes to the graphical user interface based on a comparison of the scores associated with the plurality of participants and providing the changes to the graphical user interface to the plurality of participants.

20 Claims, 6 Drawing Sheets

(56) References Cited

U.S. PATENT DOCUMENTS

| | | | | |
|---|---|---|---|---|
| 8,081,205 B2* | 12/2011 | Baird | H04L 12/1822 | 348/14.08 |
| 8,128,487 B2* | 3/2012 | Hamilton, II | A63F 13/12 | 273/138.1 |
| 8,180,852 B2* | 5/2012 | Lee | G06Q 10/10 | 709/203 |
| 8,218,829 B2* | 7/2012 | Kenoyer | G06F 21/32 | 348/14.08 |
| 8,558,868 B2* | 10/2013 | Prentice | H04N 7/147 | 235/377 |
| 8,620,365 B2* | 12/2013 | Hunziker | H04W 12/10 | 370/352 |
| 8,670,018 B2* | 3/2014 | Cunnington | G06Q 10/10 | 348/14.08 |
| 8,670,336 B2* | 3/2014 | Velenko | H04L 65/1069 | 370/252 |
| 8,902,278 B2* | 12/2014 | Pinter | G06F 19/327 | 348/14.04 |
| 8,935,263 B1* | 1/2015 | Rodriguez | G06Q 30/02 | 707/688 |
| 9,014,661 B2* | 4/2015 | deCharms | H04W 4/021 | 348/14.02 |
| 9,019,869 B2* | 4/2015 | Thorpe, III | H04L 12/1818 | 370/261 |
| 9,026,594 B2* | 5/2015 | Stevens | H04L 67/02 | 705/319 |
| 9,031,839 B2* | 5/2015 | Thorsen | G10L 15/183 | 704/235 |
| 9,064,160 B2* | 6/2015 | Norlin | G06K 9/00221 | |
| 9,113,032 B1* | 8/2015 | Vander Mey | H04N 7/15 | |
| 9,113,035 B2* | 8/2015 | Bank | H04L 65/403 | |
| 9,235,567 B2* | 1/2016 | Mylonakis | G06F 17/2818 | |
| 9,256,860 B2* | 2/2016 | Herger | H04N 7/15 | |
| 9,329,833 B2* | 5/2016 | Swierk | G06F 3/167 | |
| 9,372,940 B2* | 6/2016 | Raichelgauz | G06F 17/3002 | |
| 9,445,050 B2* | 9/2016 | Travis | H04N 7/15 | |
| 9,569,751 B2* | 2/2017 | Steiner | G06Q 10/10 | |
| 2003/0001890 A1* | 1/2003 | Brin | H04L 12/1822 | 715/753 |
| 2003/0149724 A1* | 8/2003 | Chang | H04L 12/1822 | 709/204 |
| 2004/0128350 A1* | 7/2004 | Topfl | G06Q 10/10 | 709/204 |
| 2005/0018828 A1* | 1/2005 | Nierhaus | H04L 29/00 | 379/202.01 |
| 2005/0099492 A1* | 5/2005 | Orr | H04L 12/1827 | 348/14.08 |
| 2007/0124258 A1* | 5/2007 | Bingaman | G06Q 10/10 | 705/400 |
| 2007/0211141 A1* | 9/2007 | Christiansen | H04L 29/06027 | 348/14.08 |
| 2008/0181140 A1* | 7/2008 | Bangor | H04L 65/403 | 370/261 |
| 2008/0320082 A1* | 12/2008 | Kuhlke | H04L 12/1822 | 709/205 |
| 2009/0063991 A1* | 3/2009 | Baron | H04L 12/1822 | 715/751 |
| 2009/0138554 A1* | 5/2009 | Longobardi | G06Q 10/10 | 709/204 |
| 2010/0034366 A1* | 2/2010 | Basson | G10L 15/22 | 379/202.01 |
| 2010/0037151 A1* | 2/2010 | Ackerman | G06Q 10/10 | 715/753 |
| 2010/0153858 A1* | 6/2010 | Gausman | G06Q 10/101 | 715/757 |
| 2011/0029893 A1* | 2/2011 | Roberts | G06Q 10/10 | 715/753 |
| 2011/0035680 A1* | 2/2011 | Borovoy | G06Q 10/06398 | 715/751 |
| 2011/0075820 A1* | 3/2011 | Mikan | H04L 12/6418 | 379/88.13 |
| 2011/0126119 A1* | 5/2011 | Young | G06F 17/30905 | 715/744 |
| 2011/0270663 A1* | 11/2011 | Jones | G06Q 30/0231 | 705/14.31 |
| 2011/0295392 A1* | 12/2011 | Cunnington | G06Q 10/10 | 700/90 |
| 2012/0002001 A1* | 1/2012 | Prentice | H04N 7/147 | 348/14.08 |
| 2012/0143605 A1* | 6/2012 | Thorsen | G10L 15/183 | 704/235 |
| 2012/0293599 A1* | 11/2012 | Norlin | G06K 9/00221 | 348/14.01 |
| 2013/0169742 A1* | 7/2013 | Wu | H04N 7/152 | 348/14.08 |
| 2013/0179511 A1* | 7/2013 | Stevens | H04L 67/306 | 709/204 |
| 2013/0249947 A1* | 9/2013 | Reitan | G06F 3/011 | 345/633 |
| 2013/0314228 A1* | 11/2013 | Craine | G06Q 30/0201 | 340/539.13 |
| 2014/0075330 A1* | 3/2014 | Kwon | G06F 3/038 | 715/750 |
| 2014/0099004 A1* | 4/2014 | DiBona | H04N 7/15 | 382/118 |
| 2014/0164501 A1* | 6/2014 | Herger | H04N 7/15 | 709/204 |
| 2014/0253672 A1* | 9/2014 | Bank | H04L 65/403 | 348/14.08 |
| 2014/0258393 A1* | 9/2014 | Bank | H04L 65/403 | 709/204 |
| 2015/0049162 A1* | 2/2015 | Kurupacheril | H04N 5/23238 | 348/14.08 |
| 2015/0156458 A1* | 6/2015 | Whynot | H04N 7/152 | 348/14.09 |
| 2015/0200785 A1* | 7/2015 | Gupta | H04L 12/1822 | 709/204 |
| 2016/0124940 A1* | 5/2016 | Cecchi | G06F 17/30705 | 704/9 |

* cited by examiner

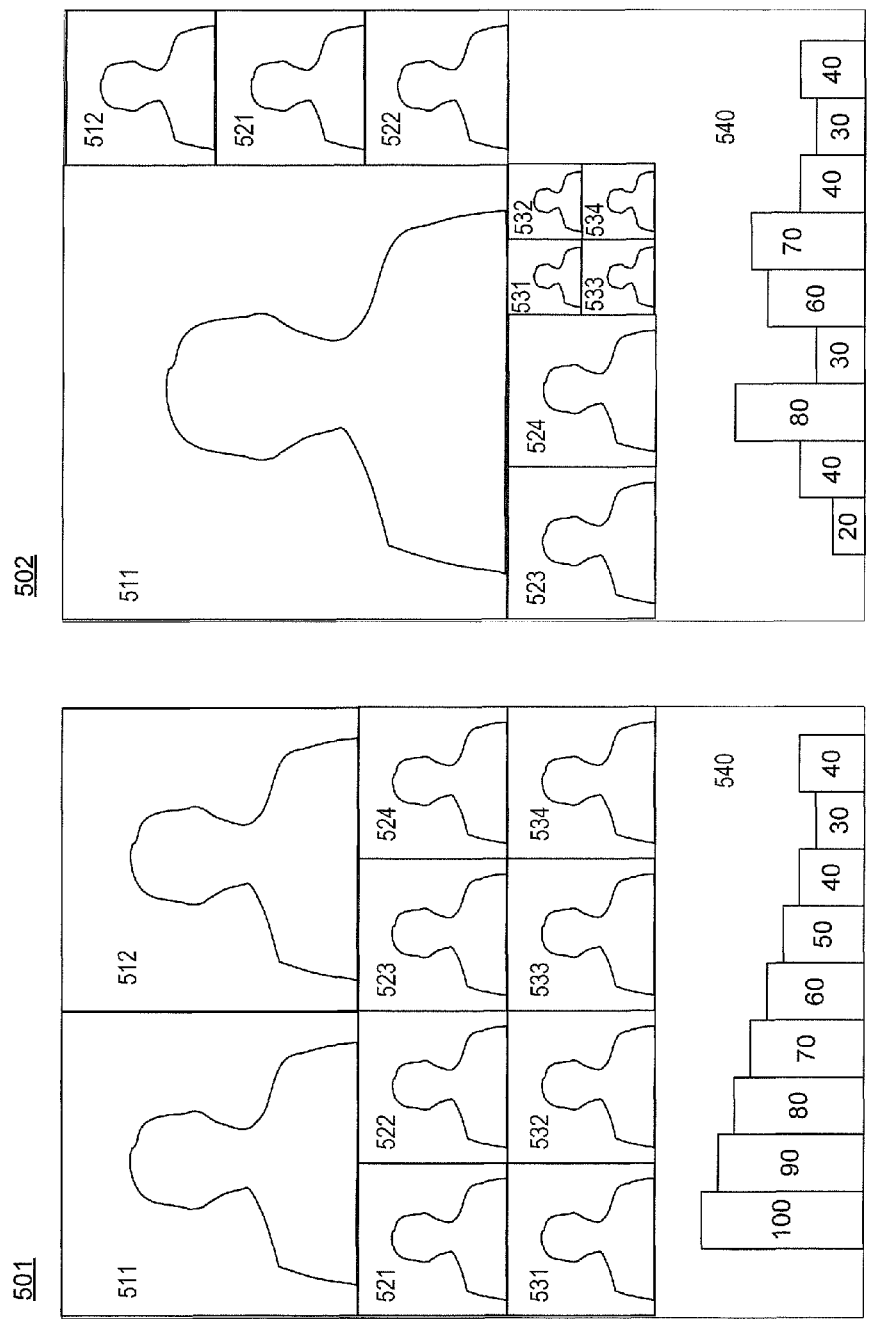

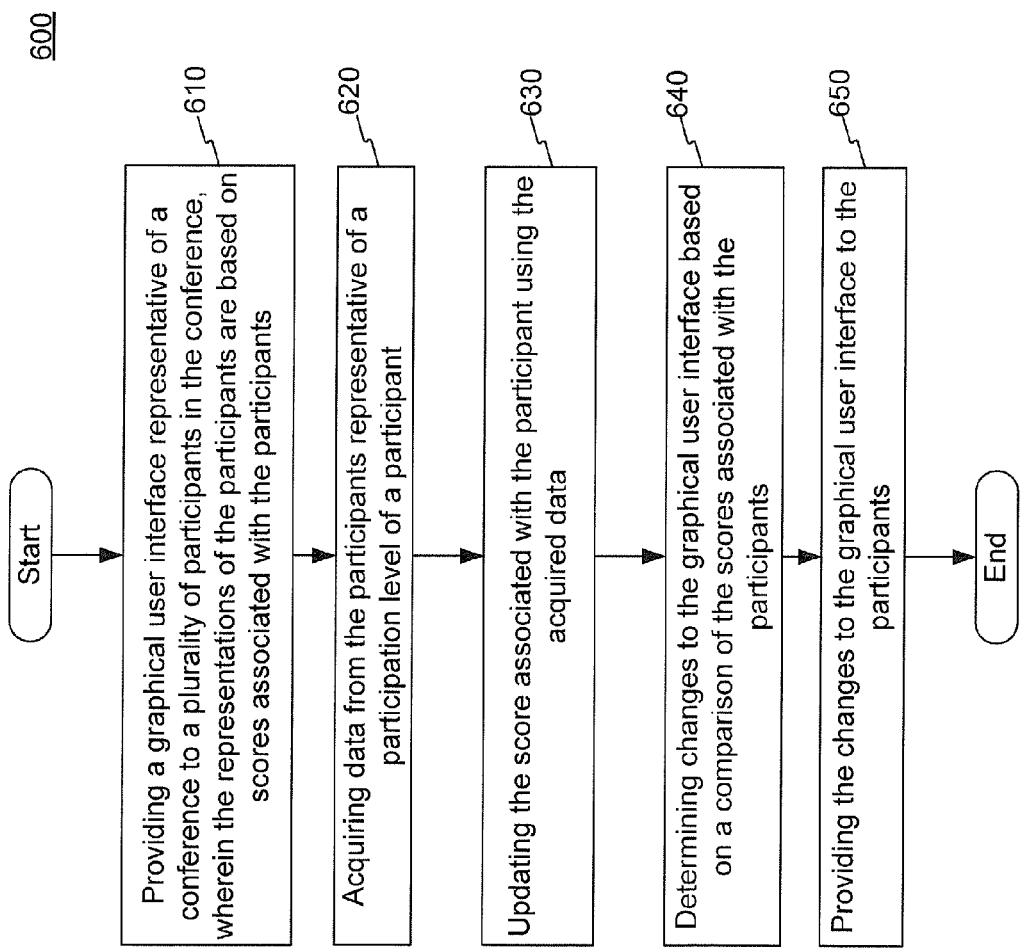

SYSTEM AND METHOD FOR DYNAMIC USER INTERFACE GAMIFICATION IN CONFERENCE CALLS

TECHNICAL FIELD

The present disclosure relates to the field of communication systems and, more particularly, to systems and methods for managing conferences in an online environment.

BACKGROUND

A conferencing system allows two or more conference participants to conduct conferences by two-way or multi-way video and/or audio transmissions using electronic devices capable of performing multimedia communications. The conferencing system communicates with devices provisioned with video and/or audio conferencing capabilities through a network, such as an integrated services digital network (ISDN) or an Internet Protocol (IP) network. A conferencing system provides a graphical user interface to the electronic devices that represent the participants and activity in the conference. In present systems, the graphical user interfaces provide little indication of which conference participant is contributing to the conference and the quality of those contributions. Moreover, existing systems provide no incentive to stimulate participation in the conference.

SUMMARY

To address these and other technical problems in the fields of electronic communications and conference call system technology, a computer-implemented method for dynamic user interface gamification in conference calls is disclosed. The method includes providing a graphical user interface representative of a conference in an online environment to a plurality of participants in the conference, wherein the graphical user interface includes representations of the plurality of participants, and the representations are based on scores associated with the plurality of participants. The method further includes acquiring data from one or more of the plurality of participants representative of a participation level of a second participant of the plurality of participants, and updating the score associated with the participant using the acquired data. Moreover, the method includes determining changes to the graphical user interface based on a comparison of the scores associated with the plurality of participants and providing the changes to the graphical user interface to the plurality of participants. In some embodiments, the data acquired by the method further includes an analysis of the quality, effect, and content of specific contributions as well as explicit feedback from other participants.

BRIEF DESCRIPTION OF THE DRAWINGS

The accompanying drawings, which are incorporated in and constitute part of this disclosure, together with the description, illustrate and serve to explain the principles of various example embodiments herein.

FIGS. 5A-5B are diagrams of example conference user interfaces, in accordance with the disclosed embodiments.

FIG. 6 is a flowchart of an example process for dynamic user interface gamification in conference calls, in accordance with embodiments of the present disclosure.

DETAILED DESCRIPTION

Figure 1:
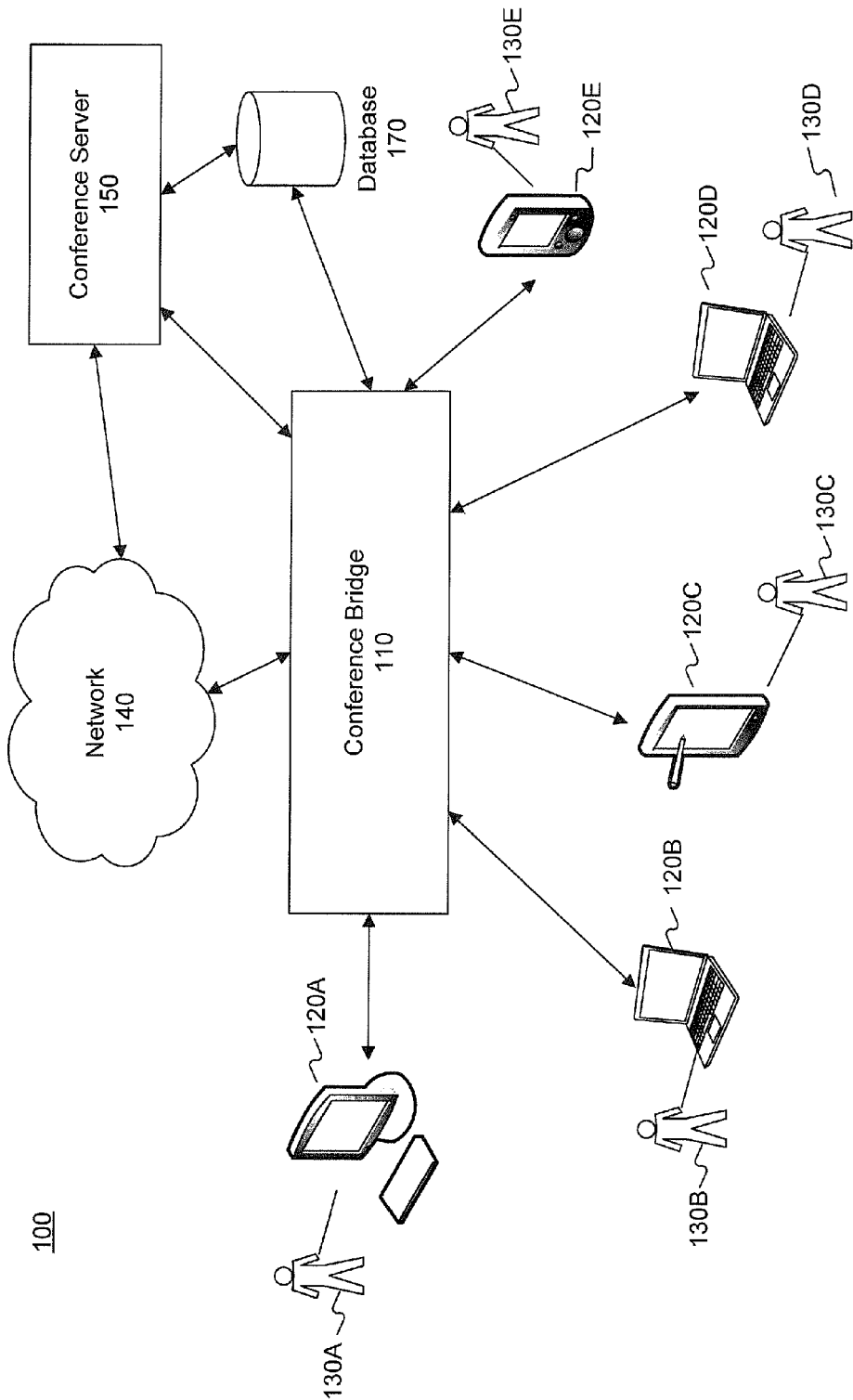
FIG. 1 is a diagram of an example of a conference system in which various implementations described herein may be practiced.

Reference will now be made in detail to the example embodiments implemented according to the present disclosure, the examples of which are illustrated in the accompanying drawings. Wherever possible, the same reference numbers will be used throughout the drawings to refer to the same or like parts.

Embodiments of the present disclosure provide methods and systems for dynamic user interface gamification in conference calls. Changes to the user interface can convey positive visual support for participants in a conference who provide contributions that improve the quality of a conference. Through dynamic changes in the conference user interface, the conference system can encourage active and/or quality participation through positive or negative reinforcement. Determinations of which participant should receive the reinforcement can be based on implicit and explicit feedback from other conference participants.

Systems and methods consistent with the disclosed embodiments can provide significant improvements to the quality, efficiency, and efficacy of conferences. The analysis of conference data can lead to dynamic updates to the conference interface providing feedback to participants related to the effect and quality of their contributions. The changing interface can also elicit or prevent behavior through the feedback provided. This process can shape the direction of the conference and help improve the interaction among the participants. Additionally, by providing dynamic changes and feedback indicators for the participants in the conference, the methods and systems of the present disclosure can result in better participant engagement. Additional disclosed systems and methods can further provide recommendations regarding which participants can be included in future conferences in order to ensure positive social interactions and the inclusion of appropriate expertise to maximize effective conference outcomes, including in areas of computer hardware and software development as well as other fields of technical and product development.

Consistent with disclosed embodiments, a computer-implemented method for dynamically changing a conference graphical user interface is provided. The method includes providing a graphical user interface representative of a conference having a plurality of participants in the conference, wherein the graphical user interface includes representations of the plurality of participants, and the representations are based on scores associated with the plurality of participants. The method also includes acquiring data from one or more of the plurality of participants representative of a participation level of a participant of the plurality of participants. Additionally the method includes updating the score associated with the participant using the acquired data and determining changes to the graphical user interface based on a comparison of the scores associated with the plurality of participants. The method further includes providing the changes to the graphical user interface to the plurality of participants. In some embodiments, the data acquired by the method further includes an analysis of the quality, effect, and content of specific contributions as well as explicit feedback from other participants.

The embodiments herein include computer-implemented methods, tangible non-transitory computer-readable mediums, and systems. The computer-implemented methods can be executed, for example, by at least one processor that receives instructions from a non-transitory computer-readable storage medium. Similarly, systems and devices consistent with the present disclosure can include at least one processor and memory, and the memory can be a non-transitory computer-readable storage medium. As used herein, a non-transitory computer-readable storage medium refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," can additionally refer to multiple structures, such a plurality of memories or computer-readable storage mediums. As referred to herein, a "memory" can comprise any type of computer-readable storage medium unless otherwise specified. A computer-readable storage medium can store instructions for execution by at least one processor, including instructions for causing the processor to perform steps or stages consistent with an embodiment herein. Additionally, one or more computer-readable storage mediums can be utilized in implementing a computer-implemented method. The term "computer-readable storage medium" should be understood to include tangible items and exclude carrier waves and transient signals.

The disclosed methods and systems are implemented in the desktop and/or mobile environments, as well as video and/or conferencing solutions. In the desktop and/or mobile environments, the disclosed conference methods and systems can be implemented as a stand-alone application or software, or are implemented within a web browser, such as a WebRTC-based environment. In the video and/or conferencing solutions, the disclosed embodiments can be implemented in conferencing consoles, conferencing displays, or similar conference systems, and user interfaces therefor.

The present disclosure arises out of the realization that conventional conference interfaces consist of static elements that provide no feedback or visual indications of participation by the conference members. Moreover, conventional conference interfaces do not provide any incentive to participants for their participation in the conference. The disclosed systems and methods provide dynamic modifications of a conference user interface based on the participation levels of the conference attendees. In addition to providing constantly updated representations of the participation level of the conference members, the changing interface can encourage conference attendees to more actively contribute to the conference in order to improve their representation on the conference's user interface. The quantity and the quality of specific participant contributions as well as the effect of a participant's contribution on the overall tone of the conference can further result in changes displayed on the conference's user interface. Determinations regarding which participants should receive positive or negative feedback can be made based on an analysis of data acquired from other participants in the conference. This feedback can be explicitly provided by the participants or implicitly determined based on participant behavior and metrics. The dynamically changing interface can improve the quality and efficiency of the conference by encouraging participants to more actively engage in the conversation and to make higher quality contributions, such as more thoughtful remarks or statements, or more lively and colorful contributions that enhance the tone of the discourse.

FIG. 1 depicts an example of a conferencing system 100 in which managing of a multimedia conference call as described herein can be implemented. Conferencing system 100 enables a plurality of multimedia electronic devices to communicate based on substantially real time multi-way video and audio transmissions. In some examples, one or more components of conferencing system 100, such as conference bridge 110, server 150, or both, can be used to implement computer programs, applications, methods, processes, or other software to perform the described techniques and to realize the structures described herein.

As shown in FIG. 1, conferencing system 100 includes a conference bridge 110, one or more multimedia electronic devices 120A-E (collectively as multimedia electronic devices 120), a network 140, a conference server 150, and a database 170. The components and arrangements shown in FIG. 1 are not intended to limit the disclosed embodiments, as the system components used to implement the disclosed processes and features can vary. For example, while FIG. 1 illustrates that multimedia electronic devices 120A-E communicate with conference bridge 110, in some embodiments, one or more of multimedia electronic devices 120A-E communicates with conference server 150 directly.

Conference bridge 110 includes a device or group of devices configured to connect multimedia electronic devices 120A-E in a conference. Conference bridge 110 can be implemented using one or more non-transitory computer readable media and one or more processors for performing functions related to the disclosed methods, such as receiving video and/or audio streams from one or more multimedia electronic devices 120A-E, and providing the received streams to the other multimedia electronic devices 120A-E.

As an example, conference bridge 110 can be a multipoint control unit (MCU) bridge that connects multimedia conference calls from a plurality of multimedia electronic devices 120A-E. To establish a multimedia conference, conference bridge 110 calls or connects multimedia electronic devices 120A-E or multimedia conference participants 130A-E (collectively as multimedia conference participants 130) use multimedia electronic devices 120A-E to call or connect to conference bridge 110. Conference bridge 110 can be an Internet Protocol (IP) or ISDN based conferencing bridge.

In some embodiments, conference bridge 110 comprises hardware and/or software components. For example, conference bridge 110 includes a multipoint controller (MC) and one or more multipoint processors (MP). The MC controls the conferencing while it is active on the signaling plane, which is where conferencing system 100 manages conferencing creation, endpoint signaling, and in-conferencing controls. The MC of conference bridge 110 can negotiate parameters with one or more multimedia electronic devices 120A-E and control conferencing resources. While the MC controls resources and signaling negotiations, the MP operates on the media plane and receives media from one or more multimedia electronic devices 120A-E. The MP generates output streams from one or more multimedia electronic devices 120A-E and redirects the information to other multimedia electronic devices 120A-E in the conference. In some embodiments, conference bridge 110 communicates or integrates with conference server 150, which executes some of the software components of conference bridge 110 by one or more processors of conference server 150.

As shown in FIG. 1, conferencing system 100 includes multimedia electronic devices 120A-E. As a first example, multimedia electronic devices 120A, 120B, and 120D comprise a video screen such as a television, tablet, computer monitor, conferencing console, or laptop computer screen. Multimedia electronic devices 120A, 120B, and 120D can also include video/audio input devices such as a video camera, web camera, or a wearable device such as a smart watch. As a second example, multimedia electronic devices 120C and 120E comprise mobile devices such as a tablet or a smartphone having display and video/audio capture capabilities. In some embodiments, conferencing system 100 also includes devices without display or video capture capabilities, such as a cellular phone or a telephone (not shown). Multimedia electronic devices 120A-E can also perform digital compression and decompression of audio and video streams. For example, multimedia electronic devices 120A-E have hardware and/or software components such as coders/decoders (codec) to perform the digital compression in substantially real time. In some embodiments, multimedia electronic devices 120A-E are operated by one or more multimedia conference participants such as multimedia conference participants 130.

Conferencing system 100 facilitates multimedia conference calls based on decentralized multipoint technologies (e.g., the H.323 technique). Using decentralized multipoint technologies, multimedia electronic devices 120A-E exchange videos and audios directly with the other multimedia electronic devices 120A-E without a conference bridge or a centralized conference manager or controller.

Network 140 comprises a computer networking arrangement used to exchange data. For example, network 140 can be the Internet, an Intranet, a private data network, virtual private network using a public network, a satellite link, and/or other suitable connection(s) that enables conferencing system 100 to send and receive information between the components of conferencing system 100. Network 140 also includes a public switched telephone network ("PSTN") and/or a wireless network such as a cellular network, Wi-Fi network, or other known wireless network capable of bidirectional data transmission.

Conference server 150 is a computer-based system including computer system components, desktop computers, workstations, tablets, handheld computing devices, memory devices, and/or internal network(s) connecting the components. In some embodiments, conference server 150 includes one or more non-transitory computer readable mediums and one or more processors for performing functions related to the disclosed methods, such as receiving video and/or audio streams from one or more multimedia electronic devices 120A-E, and providing the received streams to the other multimedia electronic devices 120A-E. Conference server 150 is a communication server that provides telecommunication services (e.g., voice, video, email, and/or facsimile) to multimedia electronic devices 120A-E. Conference server 150 can also be a video streaming server implementing, for example, the multipoint processors (MP) of conference bridge 110. As stated above, the MP operates on the media plane and receives media from one or more multimedia electronic devices 120A-E. The MP generates output streams from one or more multimedia electronic devices 120A-E and redirects the streams to other multimedia electronic devices 120A-E in the conference. An example conference server 150 is described in more detail below.

Database 170 includes one or more physical or virtual storages in communication with conference bridge 110 and/or conference server 150. Database 170 stores, for example, recorded multimedia conference contents for the current conference and/or for any previous conferences. Further, Database 170 stores contextual information about the conference call participants. Database 170 can also store video/audio messages or recordings provided by the multimedia conference participants 130. As an example, using a multimedia electronic device 120, a multimedia conference participant 130 records a video clip introducing himself or herself, a video clip providing conference call related information, photos of the multimedia conference participants, or one or more audio messages. As an example, a video clip can be generated by a multimedia electronic device 120 used by multimedia conference participant 130 or by conference server 150.

Referring to FIG. 1, conference bridge 110 and/or conference server 150 establishes a conference (e.g., a video call and/or an audio call) among multimedia electronic devices 120A-E. For example, conference bridge 110 and/or conference server 150 call each multimedia electronic devices 120A-E, or each multimedia electronic devices 120A-E call conference bridge 110 and/or conference server 150, which then operatively connect all participating multimedia electronic devices 120A-E. After the multimedia conference call is established, multimedia conference contents are transmitted and received by one or more of multimedia electronic devices 120A-E. Multimedia conference contents include, for example, video and/or audio streams, documents such as Microsoft PowerPoint slides, webcasts, podcasts, photos, texts, or messages. Additionally, conference participants interact with the conference contents through a graphical user interface provided by conference server 150 or conference bridge 110. The graphical user interface provides representations of the conference participants that include audio, video, static avatars, and/or other information related to the conference. For example, in an established multimedia conference call using conferencing system 100, multimedia conference participant 130A uses device 120A to present to the other multimedia conference participants 130B-E. Multimedia electronic device 120A transmits multimedia conference contents, such as video streams showing multimedia conference participant 130A and/or any information he or she shares, to conference bridge 110 and/or conference server 150. Conference bridge 110 and/or conference server 150 processes the multimedia conference contents received from multimedia electronic device 120A and redirect the processed multimedia conference contents to other participating multimedia electronic devices 120B-E for viewing by other conference participants 130B-E. As a result, the screens of multimedia electronic devices 120B-E display the multimedia conference contents shared by multimedia conference participant 130A within a graphical user interface for the conference.

Figure 2:
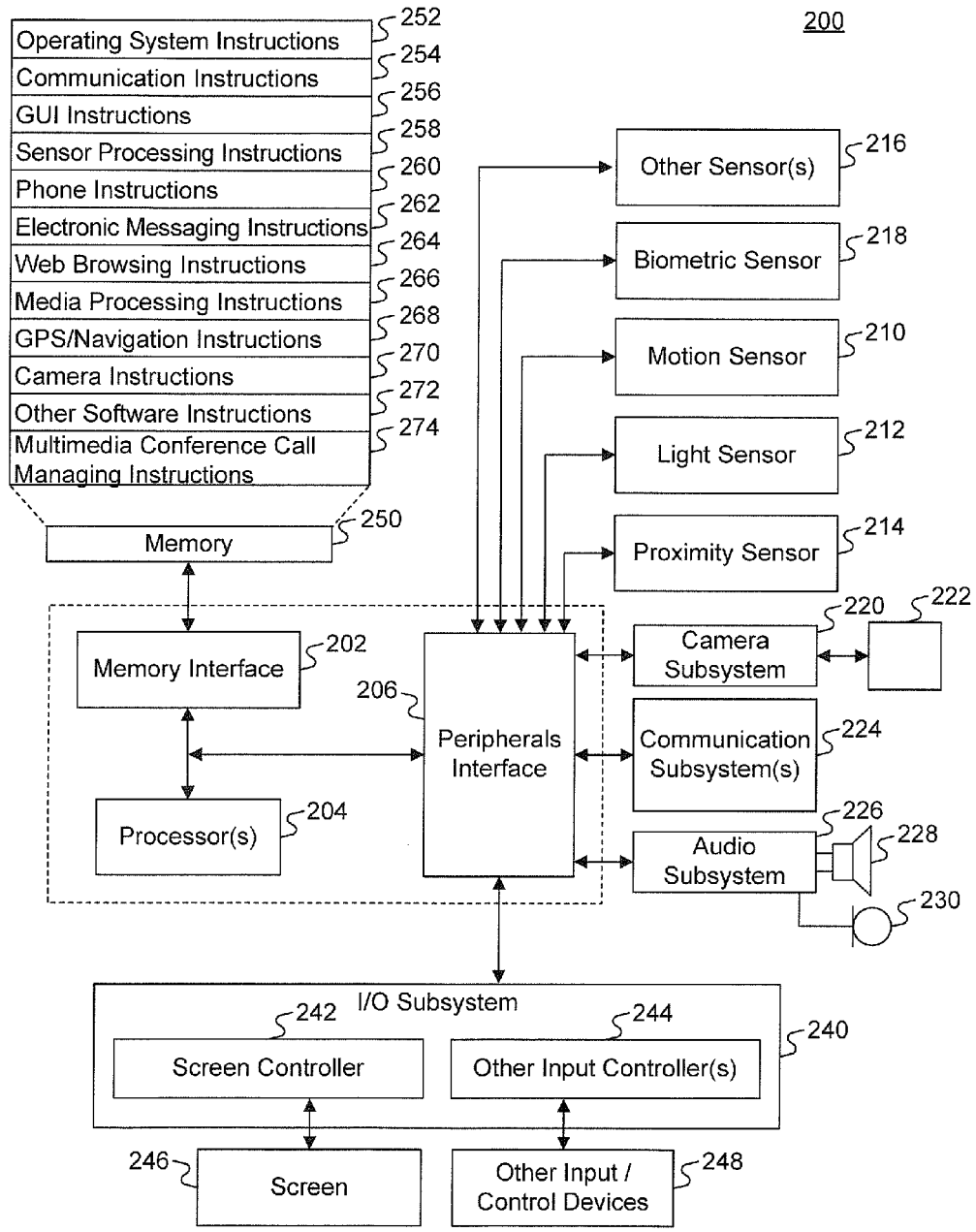
FIG. 2 illustrates example components of a device for implementing embodiments consistent with the present disclosure.

FIG. 2 is a diagram of an example multimedia electronic device 200 used in a conferencing system. Multimedia electronic device 200 can function as any of the multimedia electronic devices 120A-E devices depicted in FIG. 1. Multimedia electronic device 200 includes a memory interface 202, one or more processors 204 such as data processors, image processors and/or central processing units, and a peripherals interface 206. The memory interface 202, the one or more processors 204, and/or the peripherals interface 206 can be separate components or can be integrated in one or more integrated circuits. The various components in the multimedia electronic device 200 can be coupled by one or more communication buses or signal lines.

Sensors, devices, and subsystems are coupled to the peripherals interface 206 to facilitate multiple functionalities. For example, a motion sensor 210, a light sensor 212, a proximity sensor 214, and a biometric sensor 218 can be coupled to the peripherals interface 206 to facilitate orientation, lighting, and proximity functions. Other sensors 216 can also be connected to the peripherals interface 206, such as a positioning system (e.g., GPS receiver), a temperature sensor, or other sensing device, to facilitate related functionalities. A GPS receiver can be integrated with, or connected to, communication device 200. For example, a GPS receiver can be built into electronic devices, such as smartphone devices, tablets, portable computers, or other electronic devices. GPS software allows electronic devices to use an internal or external GPS receiver (e.g., connecting via a serial port or Bluetooth®).

A camera subsystem 220 and an optical sensor 222, e.g., a charged coupled device ("CCD") or a complementary metal-oxide semiconductor ("CMOS") optical sensor, can be utilized to facilitate camera functions, such as recording photographs and video clips.

Communication functions can be facilitated through one or more wireless/wired communication subsystems 224, which includes a Ethernet port, radio frequency receivers and transmitters and/or optical (e.g., infrared) receivers and transmitters. The specific design and implementation of the wireless/wired communication subsystem 224 depends on the communication network(s) over which the multimedia electronic device 200 is intended to operate. For example, in some embodiments, the multimedia electronic device 200 includes wireless/wired communication subsystems 224 designed to operate over a GSM network, a GPRS network, an EDGE network, a Wi-Fi or WiMax network, and a Bluetooth® network. In particular, the wireless/wired communication subsystems 224 includes hosting protocols such that the multimedia electronic device 200 can be configured as a base station for other wireless devices.

An audio subsystem 226 can be coupled to a speaker 228 and a microphone 230 to facilitate voice-enabled functions, such as voice recognition, voice replication, digital recording, and telephony functions.

The I/O subsystem 240 includes a screen controller 242 and/or other input controller(s) 244. Screen controller 242 is coupled to a screen 246. In some embodiments, screen 246 and screen controller 242 are touch enabled and can, for example, detect contact and movement or break thereof using any of a plurality of sensitivity technologies, including but not limited to capacitive, resistive, infrared, and surface acoustic wave technologies, as well as other proximity sensor arrays or other elements for determining one or more points of contact with the screen 246.

The other input controller(s) 222 is coupled to other input/control devices 248, such as one or more buttons (e.g., for controlling the volume of the speaker 228), rocker switches, thumb-wheel, infrared port, USB port, and/or a pointer device such as a stylus. The one or more buttons (not shown) include an up/down button for volume control of the speaker 228 and/or the microphone 230. The touch screen 246 can, for example, also be used to implement virtual or soft buttons and/or a keyboard.

In some implementations, the multimedia electronic device 200 presents recorded audio and/or video files, such as MP3, MP4, RM, RMVB, WMV, AVI, FLV, VOB, AAC, and MPEG files. In some implementations, the multimedia electronic device 200 can include the functionality of an MP3 player.

The memory interface 202 is coupled to memory 250. The memory 250 includes high-speed random access memory and/or non-volatile memory, such as one or more magnetic disk storage devices, one or more optical storage devices, and/or flash memory (e.g., NAND, NOR). The memory 250 stores an operating system 252, such as DRAWIN, RTXC, LINUX, UNIX, OS X, WINDOWS, or an embedded operating system such as VXWorkS. The operating system 252 can include instructions for handling basic system services and for performing hardware dependent tasks. In some implementations, the operating system 252 can be a kernel (e.g., UNIX kernel).

The memory 250 also stores communication instructions 254 to facilitate communicating with one or more additional devices, one or more computers and/or one or more servers. The memory 250 includes graphical user interface instructions 256 to facilitate graphic user interface processing. The memory 250 can also include sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GPS/navigation instructions 268 to facilitate GPS and navigation-related processes and instructions; camera instructions 270 to facilitate camera-related processes and functions; and/or other software instructions 272 to facilitate other processes and functions. Memory 250 also includes multimedia conference call managing instructions 274 to facilitate conference call related processes and instructions. In some implementations, the media processing instructions 266 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. Memory 250 can include additional instructions or fewer instructions. Furthermore, various functions of the multimedia electronic device 200 can be implemented in hardware and/or in software, including in one or more signal processing and/or application specific integrated circuits.

Figure 3:
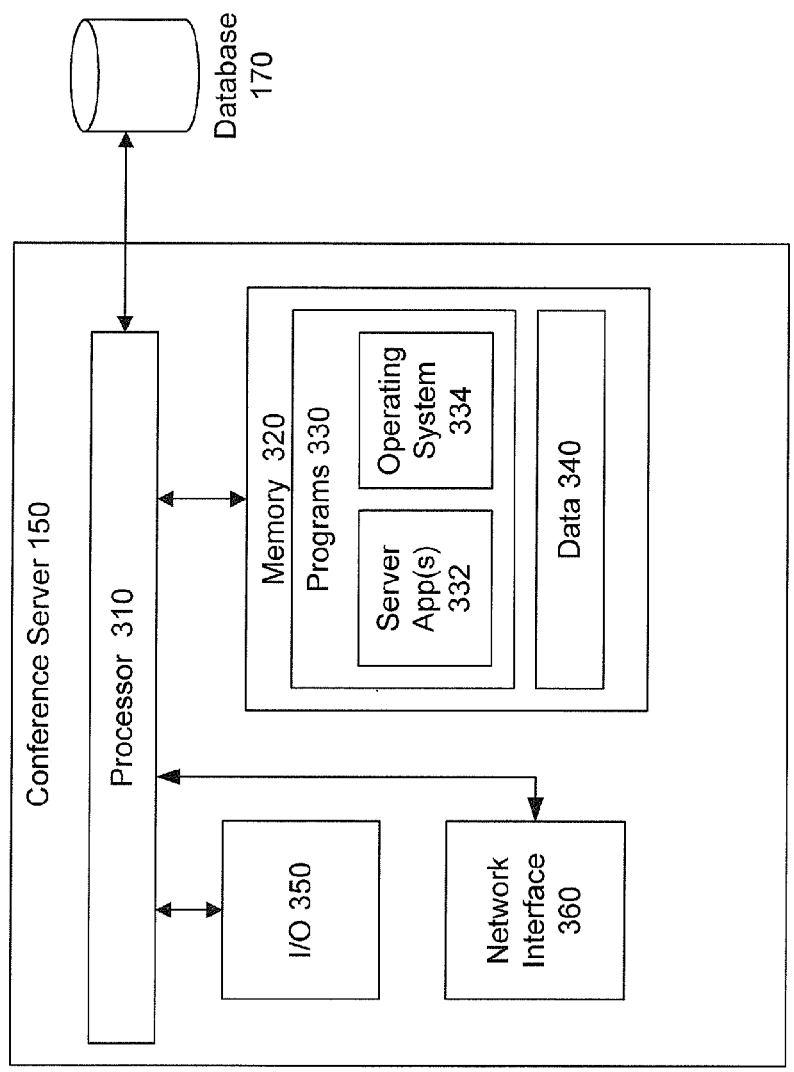
FIG. 3 is a diagram of an example conference server, in accordance with the disclosed embodiments.

FIG. 3 shows a diagram of an example conference server 150, consistent with the disclosed embodiments. As shown, conference server 150 can include one or more processors 310, input/output ("I/O") devices 350, network interface 360, and one or more memories 320 storing programs 330 including, for example, server app(s) 332 (i.e., server applications or programs), operating system 334, and data 340, and can communicate with an external database 170 (which, for some embodiments, can be included within conference server 150). Conference server 150 can be a single server or can be configured as a distributed computer system including multiple servers, server farms, clouds, or computers that interoperate to perform one or more of the processes and functionalities associated with the disclosed embodiments.

Processor 310 can be one or more processing devices configured to perform functions of the disclosed methods, such as a microprocessor manufactured by Intel™ or AMD™. Processor 310 can constitute a single core or multiple core processors executing parallel processes simultaneously. For example, processor 310 can be a single core processor configured with virtual processing technologies. In certain embodiments, processor 310 uses logical processors to simultaneously execute and control multiple processes. Processor 310 can implement virtual machine technologies, or other technologies to provide the ability to execute, control, run, manipulate, store, etc. multiple software processes, applications, programs, etc. In some embodiments, processor 310 includes a multiple-core processor arrangement (e.g., dual, quad core, etc.) configured to provide parallel processing functionalities to allow conference server 150 to execute multiple processes simultaneously. It is appreciated that other types of processor arrangements could be implemented that provide for the capabilities disclosed herein.

Memory 320 is a volatile or non-volatile, magnetic, semiconductor, tape, optical, removable, non-removable, or other type of storage device or tangible or non-transitory computer-readable medium that stores one or more program(s) 330 such as server apps 332 and operating system 334, and data 340. Common forms of non-transitory media include, for example, a flash drive a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Conference server 150 includes one or more storage devices configured to store information used by processor 310 (or other components) to perform certain functions related to the disclosed embodiments. For example, conference server 150 includes memory 320 that includes instructions to enable processor 310 to execute one or more applications, such as server apps 332, operating system 334, and any other type of application or software known to be available on computer systems. Alternatively or additionally, the instructions, application programs, or the like can be stored in an external database 170 (which can also be internal to conference server 150) or external storage in communicatively coupled with conference server 150 (not shown), such as one or more database or memory accessible over network 140.

Database 170 or other external storage is a volatile or non-volatile, magnetic, semiconductor, tape, optical, removable, non-removable, or other type of storage device or tangible or non-transitory computer-readable medium. Memory 320 and database 170 can include one or more memory devices that store data and instructions used to perform one or more features of the disclosed embodiments. Memory 320 and database 170 can also include any combination of one or more databases controlled by memory controller devices (e.g., server(s), etc.) or software, such as document management systems, Microsoft SQL databases, SharePoint databases, Oracle™ databases, Sybase™ databases, or other relational databases.

In some embodiments, conference server 150 is communicatively coupled to one or more remote memory devices (e.g., remote databases (not shown)) through network 140 or a different network. The remote memory devices can be configured to store information that conference server 150 can access and/or manage. By way of example, the remote memory devices could be document management systems, Microsoft SQL database, SharePoint databases, Oracle™ databases, Sybase™ databases, or other relational databases. Systems and methods consistent with disclosed embodiments, however, are not limited to separate databases or even to the use of a database.

Programs 330 can include one or more software modules causing processor 310 to perform one or more functions of the disclosed embodiments. Moreover, processor 310 can execute one or more programs located remotely from one or more components of conferencing system 100. For example, conference server 150 can access one or more remote programs that, when executed, perform functions related to disclosed embodiments. In some embodiments, programs 330 stored in memory 320 and executed by processor(s) 310 can include one or more server app(s) 332 and operating system 334.

Server app(s) 332 cause processor 310 to perform one or more functions of the disclosed methods. For example, server app(s) 332 cause processor 310 to provide a graphical user interface representative of a conference in an online environment to a plurality of participants in the conference (e.g., to multimedia electronic devices 120), wherein the graphical user interface includes representations of the plurality of participants (e.g., participants 130), and the representations are based on scores associated with the plurality of participants; acquire data from one or more of the plurality of participants representative of a participation level of a participant of the plurality of participants; update the score associated with the participant using the acquired data; determine changes to the graphical user interface based on a comparison of the scores associated with the plurality of participants; and provide the changes to the graphical user interface to the plurality of participants.

In some embodiments, program(s) 330 include operating system 334 performing operating system functions when executed by one or more processors such as processor 310. By way of example, operating system 334 include Microsoft Windows™, Unix™, Linux™, Apple™ operating systems, Personal Digital Assistant (PDA) type operating systems, such as Microsoft CE™, or other types of operating systems 334. Accordingly, disclosed embodiments can operate and function with computer systems running any type of operating system 334. Conference server 150 can also include communication software that, when executed by a processor, provides communications with network 140 and/or a direct connection to one or more multimedia electronic devices 120A-E via network interface 360.

In some embodiments, data 340 include, for example, multimedia conference contents, substitute contents, and/or other elements used to construct the graphical user interface for the conference. For example, data 340 include buffered or processed video/audio streams provided by multimedia electronic devices 120A-E, information associated with the present or previous conference, a video clip introducing a multimedia conference participant 130, a video clip providing conference related information, photos of the multimedia conference participants, one or more audio messages, avatars associated with conference participants, widgets used to provide feedback. Data 340 can further include participant feedback and conference evaluations including explicit and implicit participant evaluations and raw sensor data (e.g., data from proximity sensor 214, light sensor 212, motion sensor 210, biometric sensor 218, and/or other sensor(s) 216).

Conference server 150 also includes one or more I/O devices 350 having one or more interfaces for receiving signals or input from devices and providing signals or output to one or more devices that allow data to be received and/or transmitted by conference server 150. For example, conference server 150 includes interface components for interfacing with one or more input devices, such as one or more keyboards, mouse devices, and the like, that enable conference server 150 to receive input from an operator or administrator (not shown).

Conference server 150 also includes network interface 360 for communicating across a network with other components such as conference bridge 110, database 170, and/or multimedia electronic devices 120. Network interface 360 can communicate over standard networking protocols and mechanisms, such as ISDN or IP infrastructures.

Figure 4:
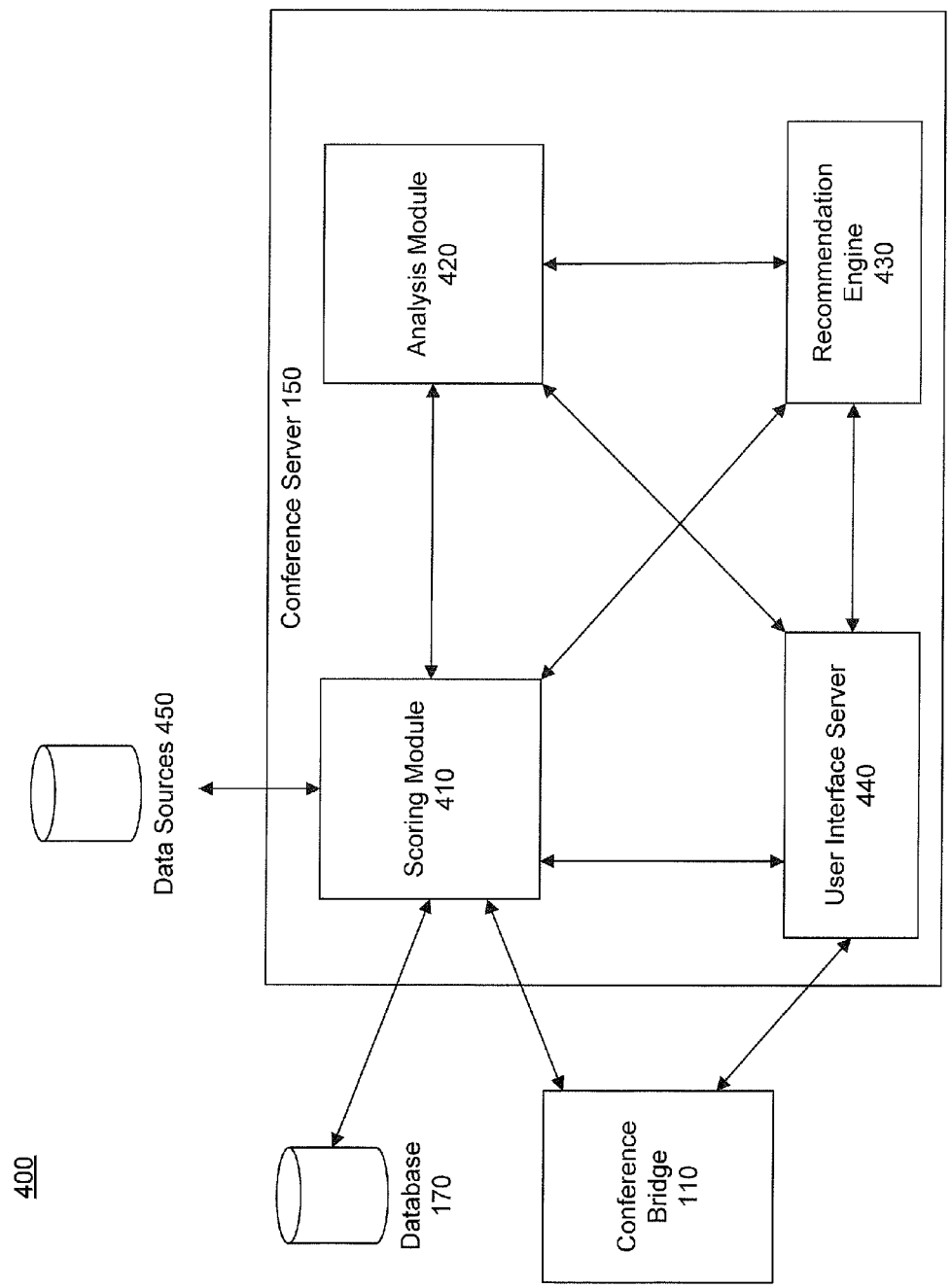
FIG. 4 is a diagram of an example conference server, in accordance with the disclosed embodiments.

FIG. 4 shows a diagram of an example conference server 150, consistent with the disclosed embodiments. As shown, conference server 150 includes structures such as modules and/or components that can be packaged hardware units designed for use with other components, executable instructions, or a part of a program that performs a particular function. Each module can consist of multiple sub-modules or can be a sub-module that is part of a corresponding module. As shown in this example, conference server 150 includes modules such as scoring module 410, analysis module 420, recommendation engine 430, and user interface server 440. The components shown in FIG. 4 can be stored in memory 320 and one or more of programs 330 executed on processor 310. These modules can also be stored as server app(s) 332 that provide the disclosed functionality. Similarly to FIG. 3, the modules and components in FIG. 4 can access I/O 350, database 170, and network interface 360. Additionally, conference server 150 can access data sources 450 and provide data to conference bridge 110 via network interface 360 or I/O 350.

Scoring module 410 maintains scores of potential participants for a conference and can retrieve and update scores associated with the participants in a conference. Scoring module 410 can base score updates on a variety of factors. For example, feedback from analysis engine 420, recommendation engine 430, user interface server 440, and other connected components, direct participant feedback, and internal calculations can drive modifications to a participant's score. Moreover, scoring module 410 can receive and process information affecting participant scores at any time and is not limited to receiving data associated with the current conference, current conference participants, or an active conference.

Scoring module 410 can also store scores in database 170. Scores in database 170 are not limited to only scores for those participants in a current conference. Database 170 can store scores for any individual or entity that can participate in a conference. Scoring module 410 can receive information from, among other sources, analysis module 420, recommendation engine 430, and user interface server 440, update the score for the participant and store the updated score in database 170. The score associated with a participant can represent the level of participation of the participant in the conference. Scoring module 410 can update the scores for participants in the conference as the conference takes place in real time or through additional analysis performed after the conference is complete. Each score can be increased and decreased as scoring module 410 acquires new data.

Scoring module 410 can consider contextual information when accessing and manipulating scoring information. For example, participants who have expertise can have higher scores if the subject matter of the conference matches their particular expertise. Conversely a participant who lacks expertise matching the specific context of a conference can have a lower initial score in that particular conference. A participant's expertise may be determined from an internal database or an enterprise global contact list, or from external sources namely professional directories such as LinkedIn®. In these examples, the initial score for the same participant can thus be different depending on the context of the conference.

In some embodiments, the position of the participant within an organization or entity can drive the participant's score. For example, in these embodiments, a vice president starts with an initially higher score than an entry-level employee, or vice versa. Moreover, the contextual information associated with a participant can also affect the significance of score updates. For example, the vice president can be less susceptible to negative score adjustments than employees lower in the organizational chart, or vice-versa. Scoring module 410 can store contextual information associated with a participant that can affect initial scoring and score updates in database 170 and provide that contextual information to other modules (e.g., analysis module 420 and recommendation engine 430).

Additionally, scoring module 410 can retrieve contextual information from data sources 450 external to conference server 150. For example, organizations or entities can maintain separate systems for managing projects, team collaboration, e-mail, internal discussions and communication, and internal documentation and resources. Additionally, an organization can maintain an employee directory that includes an employee's biographical data, technical, practical, and job experience, position in the structure and hierarchy of the organization (e.g., based on an organizational chart), and relationships with other employees. By integrating such a directory with conference server 150 using a directory service, conference server 150 can use this additional contextual information in scoring, for example, the scoring behavior for a vice president of the organization is different than that for an entry-level employee.

These systems can contain information about the activity level of various participants who can join a conference as well as non-conference interactions between conference participants For example, in a collaboration session between various participants, some participants may make more significant contributions to the collaboration session by, for instance, posting a higher volume of relevant messages or completing a larger number of tasks associated with the collaboration session. Similarly, in an e-mail thread pertaining to a project, some participants may make a larger contribution to the discussion by sending a higher number of correspondences. These types of systems can be generically referred to as project data systems and can include any systems, infrastructures, or storage of data related to the participants and/or their interactions with each other. In some embodiments, scoring module 410 has direct access to project data systems. In other embodiments, scoring module 410 accesses project data systems through another module, component, or layer that provides access to the data stored in a project data system.

In some embodiments, scoring module 410 uses this information combined with contextual information regarding an active conference to establish initial and ongoing scores for the conference participants. For example, a project data system can contain information about materials and discussions for a particular project created by a particular participant (e.g., participants 130A). In this example, scoring module 410 can adjust the score for the particular participant in conferences about the particular project based on the data acquired from the collaboration system. For example, if participant 130A has extensive experience with project packaging, participant 130B is a backend software engineer, and the conference is related to in store product marketing, participant 130A may start with a much higher score than participant 130B when the conference begins. In these embodiments, activity outside of conference server 150 can affect a calculated score for a conference call participant.

Scoring module 410 can also access data available from other participants in the conference through conference bridge 110. Conference bridge 110 can provide input data retrieved from participant devices (e.g., multimedia electronic devices 120) connected to conference bridge 110. In some embodiments the input data includes direct feedback from participants (e.g., participants 130A-E) that explicitly identify positive or negative contributions of other conference participants. Participants can provide this feedback through widgets or other interactive elements included in the graphical user interface displayed on the multimedia electronic devices (e.g., multimedia electronic devices 130). In these embodiments, the direct feedback can be in the form of upvotes or downvotes demonstrating approval or disapproval of current contributions by another participant in the conference. Scoring module 410 can use this direct feedback in calculating a new score for the participant that is the subject of the direct feedback.

In some embodiments, the source of the feedback can influence the score update applied by scoring module 410. For example, feedback from a participant (e.g., participant 130C) who is a vice president or executive can result in a more substantial score change than feedback from a participant (e.g., participant 130D) who is an entry-level employee. Moreover, the relative scores of participants can drive the amount of the score change applied by scoring module 410. For example if participant 130D has a higher current score than participant 130E, than feedback from participant 130D can have a larger impact on score changes than feedback from participant 130E. Additionally scoring module 410 can consider the expertise level of the various participants when determining score changes. For example, positive feedback from an expert participant can be given more weight by scoring module 410 than negative feedback provided by one or more participants who are not experts in the subject matter under discussion. Moreover, scoring module 410 can interpret the expert feedback as affecting the substantive aspect of a contribution to the conference while simultaneously interpreting the negative feedback from non-experts as related to the manner or tone of the contribution. Accordingly, scoring module 410 can consider both positive and negative feedback for the same contribution, analyze the source of the feedback, and adjust the score accordingly.

Scoring module 410 can also base scoring decisions on the absence of data. For example, scoring module 410 can identify a participant who has not contributed to the conference and can decrease that participant's score. In this way, scoring module 410 can continually decrease the score of a participant that does not provide any contribution to the conference. This decrease in score can cause participants who are not contributing to engage in the conference. Scoring module 410 can also view a lack of feedback from a participant as a lack of activity. For example, scoring module 410 can decrease the score of individual who has not provided any explicit feedback. Accordingly, in some embodiments, scoring module 410 can decrease a score for a participant for not providing explicit feedback even if the participant has received score increases for other activity.

In some embodiments, multimedia electronic devices (e.g., devices 120A-E) can indirectly measure participant (e.g., participant 130A-E) reactions to contributions to the conference providing implicit feedback from the participant. For example, a multimedia electronic device 120A that is equipped with a camera (e.g., camera subsystem 220 and optical sensor 222) can use facial recognition techniques to interpret a participant's 130A reactions to what is being presented in a conference. In this example, laughter or smiling can be interpreted as a positive reaction. The positive reaction can be transmitted by the multimedia electronic device to scoring module 410 via conference bridge 110 and used to adjust the score of the participant eliciting the reaction. Similarly, the camera can be used to monitor behavior and the system can use this to detect disapproving reactions by a participant, such as recognizing a face palm gesture or other negatively connoted gesture by the participant. A negative reaction can likewise be transmitted by the multimedia electronic device to scoring module 410 via conference bridge 110 and used to negatively adjust the score of the participant eliciting the negative reaction.

Additional sensors (e.g., motion sensor 210, light sensor 212, proximity sensor 214, biometric sensor 218) can provide additional feedback and indications of a participant's reaction to the conference. For example, a biometric sensor can record changes in heart rate, a motion sensor can record specific gestures or motions, an audio subsystem can record audible reactions such as laughter. The readings from sensors can be interpreted separately or in combination to determine the resulting reaction of the participant being measured. For example, audio analysis can be used to detect scoring cues such as participant laughter, requiring no analysis of visual data using computer vision or facial recognition techniques. Furthermore, certain participant gestures can be detectable by analysis of the audio that can be undetectable merely from analysis of the conference video streams or other inputs, such as throat clearing gestures, sighing, breathing affectations, tone of voice, specific patterns in speech, and others. Moreover, the sensors can exist in separate devices associated with the same participant. For example, the participant's multimedia electronic device can monitor audio while a smart watch or other wearable device can measure motion.

Biometric sensors (e.g., biometric sensors 218) of a multimedia electronic device (e.g., one of multimedia electronic devices 130 depicted in FIG. 1) can read both physiological and behavioral characteristics. Physiological metrics can include, among other things, facial recognition, odor or scent recognition, perspiration measurements, electrodermal activity ("EDA"), iris or retina measurements, or other measurements of physiological responses to information. Behavioral characteristics can include, among other things, typing rhythm, gait, vocal fluctuations, hand gestures, and/or physical mannerisms. Interpretations of these biometric events can result in an implicit approval or disapproval of the activity in the conference.

Conference bridge 110 can provide scoring module 410 with a stream of events related to an ongoing conference. This stream can include the previously described explicit and implicit data from multimedia client devices 120 as well as raw sensor data (e.g., data from proximity sensor 214, light sensor 212, motion sensor 210, biometric sensor 218, and/or other sensor(s) 216). The scoring module can further interpret received event data to make scoring adjustments for the conference participants. As events are acquired from the stream, scoring module 410 can dynamically update the scores of the participants of the conference as the conference progresses. Scoring module 410 can store the updates in database 170 and/or provide the score changes to other components of conference server 150 such as analysis module 420, recommendation engine 430, and user interface server 440.

Analysis module 420 can further process scoring data using statistical analysis and other methods to search for trends and patterns in the conference data. Analysis module 420 can provide charts and statistics to user interface server 440 for display on the conference UI. Analysis module 420 can also analyze conference data for patterns and correlations that can impact conference outcomes.

Analysis module 420 can provide statistical analysis of an ongoing conference. This analysis can be reviewed after the conference or the analysis can be visualized and provided to user interface server 440 for display on the conference user interface. In some embodiments the visualization can be in the form of a chart, graph, raw data, highlights, or other statistical visualizations. The visualization can enhance the experience for those participating in the conference and provide insight into the conference dynamics. For example, analysis module 420 could provide a chart of the top contributors in the conference, the participants who have increased or decreased their score the most, or the participants who have contributed the most feedback. It is readily apparent that more advanced statistical analysis can be performed and visualized for an ongoing conference. Moreover, the analysis and trend data can be stored (e.g., in database 170) for later interpretation and review.

Analysis module 420 can analyze past conference data and be trained to recognize reoccurring patterns or behaviors that affect a conference. Based on this data, analysis engine can provide suggestions or tips to user interface server 440 for display on the conference user interface. These suggestions or tips can help improve the efficiency and efficacy of the conference based on interactions that have occurred in past conferences.

As more and more conferences are analyzed, the training of analysis module 420 can improve leading to better suggestions and future analysis. This analysis can provide a mechanism by which effective, satisfying, and productive conferences can be more consistently achieved through monitoring of the various participants' contributions within conferences, correlating patterns of contribution to successful conference outcomes, and subsequently modulating participant behavior through incentives such as scoring, rewards, badges, and other mechanics of gamification, to steer the pattern of a conference towards those patterns that have been found to correlate to positive and productive outcomes.

For example, analysis engine 420 can determine when a threshold number of participants disapprove of a specific topic or presenter. In this example, analysis engine 420 can recognize the situation based on trained data or on an inherent analysis and provide a suggestion to the participants to shift to a different topic of discussion. In this way analysis engine 420 can assist with maintaining more focused and effective conferences. In another example, analysis engine 420 can determine that a threshold level of tension has been breached in the interactions between participants in a conference. In this example, analysis engine 420 can recognize the situation based on trained data or on an inherent analysis and provide a suggestion to the participants to lighten the tone of the interactions, introduce levity into the interactions, and/or temporarily pause or suspend the conference. In such an event, a participant who is effectively able to bring levity to the conference through a next contribution may be rewarded by a positive adjustment to their score by scoring module 410.

As shown in FIG. 4, recommendation engine 430 can acquire data from, among other sources, scoring module 410, analysis module 420, database 170, and data sources 450. In some embodiments, data can first be filtered and processed by, for example, scoring module 410 or analysis engine 420 before consumed by recommendation engine 430. Recommendation engine 430 can combine analysis from analysis module 420, scoring and contextual information from scoring module 410, and other internal data to make recommendations for future and ongoing conferences. Recommendation engine 430 can examine interactions between participants, conferences on particular types of subject matter, and other types of interactions and information to provide recommendations for improving conferences.

In some embodiments, recommendation engine 430 can perform general behavioral analysis on existing conferences. This analysis can, in some embodiments, provide insights into the chemistry and interactions between various participants and topics. For example, two particular participants can fundamentally disagree on a specific topic leading to a deadlocked decision making process. Recommendation engine can, in those embodiments, suggest only including one of the two participants based on, for example, which one has more relevant experience or expertise for the specific conference, in order to facilitate a more productive conference. In these embodiments, recommendation engine 430 can rely on contextual information about the participants and the conference in making appropriate recommendations on who should be included. For participants with limited availability and/or who may be experts on specific subjects, recommendation engine 430 can utilize information related to resource availability and participant availability and/or schedules to effectively balance the demand of different conferences on resources and individuals, so as to not benefit certain conferences at the expense of others. In this way, recommendation engine 430 can ensure that conferences contain an effective mix of participants and that a conference includes no more subject matter experts than truly necessary. Similarly, recommendation engine 430 can ensure that a conference includes a sufficient amount of subject matter experts to allow for an effective conference. Recommendation engine 430 can also use resource and individual availability information to achieve specific outcomes where conferences can be balanced with a complement of more skilled and lesser skilled participants. In this way, recommendation engine 430 can allow lesser skilled participants to gain exposure to more skilled participants and learn through interaction with more skilled participants, and recommendation engine 430 can ensure that a conference is not biased too heavily towards highly or lightly skilled participants while other conferences are biased too heavily in the opposite direction.

Similar to analysis module 420, recommendation engine can be trained using traditional machine learning techniques. The results of past recommendations and conferences can be used as a training set to improve the effectiveness of future recommendations.

User interface server 440 can receive information from, among others, scoring module 410, analysis module 420, and recommendation engine 430. Based on this information, user interface server 440 can generate updates to the conference user interface. The updated user interface can be provided to conference bridge 110 for distribution to multimedia electronic devices 120. It is appreciated that the user interface changes can include full frames or delta values that represent only the information on the interface that has changed.

As scores for individual participants change, user interface server 440 can dynamically modify the user interface elements that represent specific participants to convey the changes in score. These types of updates are further described in FIGS. 5A-5B. In some embodiments, user interface server 440 can provide charts, graphs, or other data provided by analysis module 420 for display on multimedia electronic devices 120. Moreover, in some embodiments, user interface server 440 can provide suggestions generated by analysis module 420 and recommendation engine 430.

As more data is processed by the various components of conference server 150 (e.g., scoring module 410, analysis module 420, and/or recommendation engine 430) user interface server 440 can constantly update the conference interface to reflect the updated data. In some embodiments, user interface server 440 will change in a manner to emphasize those participants deemed to be providing the most positive contributions to the conference. In this way, user interface server 440 can attempt to encourage other participants to improve their participation in an effort to earn the recognition being provided. This gamification of the conference user interface can help encourage behavior that positively affects a conference resulting in higher quality conferences. Moreover, this gamification can create inherent competition among the participants to provide better contributions to the conference.

In some embodiments, the conference interface displays a representation of a participant's score through, for example, a number, a level bar widget, or other indicator. Additionally, the conference interface can display badges, banners, alternative score indicators, or other indicators of an achievement of a participant. For example, a participant who elicits laughter can earn specific levity points that can be displayed on the conference interface using a separate levity bar or levity score number. In some embodiments, these types of specific achievements can be represented by badges, icons, or other indicators specific to causing laughter. Additionally, the conference interface can utilize sound, animations, or other indicators to represent changes to, among other things, a participant's score, badges, status, and/or achievements. In some embodiments, the conference interface can utilize additional indicators to represent accolades earned in past conferences. In some embodiments, achievements, badges, banners, or other identifiers from previous conferences follow a participant to future conferences so that participants can begin new conferences with achievements, banners, badges, or other awards earned in past conferences.

The conference interface can further utilize a plurality of visual techniques to represent the scores for the conference participants including highlighting the higher scoring participants by means of some forms of graphical filters, such as by making the higher scoring participants appear in color while lower scoring participants can appear in gray scale. The conference interface can further provide color coded borders or overlay icons to indicate relative scores, classes of scores, or scoring ranks. Additionally, the conference interface can utilize graphical badges or trophies to indicate achievements and actual scores using visual indicators, such as score numbers or value bars.

In some embodiments, updates generated by user interface server 440 can account for the variety of multimedia client devices 120 that can connect to conference bridge 110. In one example as shown in FIG. 1, multimedia electronic device 120A can represent a desktop computer while multimedia client device 120E can represent a mobile phone or tablet. These devices can have vastly different resolutions, aspect ratios, and screen sizes. Accordingly, in this example, user interface updates provided by user interface server 440 through conference bridge 110 that are appropriate for multimedia electronic device 120E may not be appropriate for multimedia electronic device 120A. In some embodiments, user interface server 440 can provide different user interface updates to multimedia electronic devices 120A and 120E that are specific to the characteristics of each device.

In some embodiments, user interface server 440 will provide instructions or messages that can instruct each multimedia client device 120 to update its associated user interface. In these embodiments, the same instruction or message from user interface server 440 can be interpreted and applied in device specific ways by the conference software executing on each multimedia client device 120. These embodiments reduce the resources required by user interface server 440 by eliminating the need to transmit multiple forms of a user interface change for every user interface update. Instead, in these embodiments, one instruction or message from user interface server can affect device specific user interface changes. Moreover, as new multimedia electronic devices are introduced, user interface server 440 does not need to be updated to handle the new device. Instead, the software executing on the new multimedia electronic device can contain the necessary executable instructions to interpret the messages already provided by user interface server 440.

FIGS. 5A-5B show a diagram of an example conference user interface, consistent with disclosed embodiments. FIG. 5A represents a user interface on a mobile device (e.g., electronic device 120E shown in FIG. 1), or a tablet device (e.g., electronic device 120C shown in FIG. 1). FIG. 5B represents the same user interface at a later point in time as modified by conference server 150 and user interface server 440. In FIG. 5A, avatars 511, 512, 521-524, and 531-534 can represent participants in the conference. Each avatar is associated with a participant. These avatars can be a static drawing, picture of the corresponding participant, or video and/or audio feeds of each participant. Chart 540 can represent a chart or graph provided by analysis engine 530 or some other source.

The example conference user interfaces depicted in FIGS. 5A and 5B are exemplary. In addition to the elements shown in FIGS. 5A and 5B, the conference user interface can include additional, widgets, indicators, and/or other user interface elements. In some embodiments, the conference user interface contains less than that shown in FIGS. 5A and 5B.

In the example embodiment of FIG. 5A, avatars 511 and 512 are larger than the remaining avatars. In some embodiments, visual enhancement techniques, such as, for example, foreground or background highlighting, pulsating, and/or shading, can provide more visual prominence to the avatars 511 and 512. The relative size of the avatars can represent the relative scores associated with the participants represented by each avatar. For example, as shown in FIG. 5A, the participants represented by avatars 511 and 512 can have a higher score than the remaining participants. In this example, avatar 511 and 512 can represent two participants with the same score. In some embodiments, FIG. 5A can represent the initial layout for a conference. In these embodiments, the size of avatar 511 and 512 can indicate that the associated participants have a higher initial score based on past conferences, have particular expertise relative to the other participants, or have a higher score due to their relative position in the company.

FIG. 5B can represent the same user interface depicted in FIG. 5A at a later point in time. As shown in reference to FIG. 4, as the conference progresses, feedback from multimedia client devices 120 can cause user interface server 440 to instruct multimedia client devices 120 to update their user interface. As shown in FIG. 5B, avatar 511 can increase in size due to positive activity by the participant associated with avatar 511. Conversely, avatars 531-534 can shrink representing negative activity by the participants associated with those avatars. Similarly, avatar 512 can shrink in size to show a lack of activity by the participant associated with avatar 512. Thus, changes to the avatars can demonstrate both active participation, and also inactivity from the participants. In some embodiments, as the conference progresses, initial score determinations become less relevant as score updates from scoring module 410 result in adjustments to the user interface. As shown in FIG. 5B, avatars 521-524 can remain static in size to represent no relative negative or positive contributions by those participants. Dynamic changes to the displayed avatars can occur constantly over the course of a conference. In some embodiments, many or all of the elements are constantly updated providing a fluid display that is rapidly changing to show various aspects of participant activity. Updates to the conference display can include changes in all of the displayed elements and is not limited to just the avatars. For example, chart 540 can update based on changing data as represented by the difference in the values of chart 540 between FIGS. 5A and 5B.

These user interface changes are exemplary. The user interface can include avatars based on the participant score. It is appreciated that changes in the score can be represented in a variety of ways. In some embodiments, color may be used to indicate positive and negative changes. In some embodiments, an outline can show the currently active participant. In some embodiments, changes in avatars associated with various participants causes the overall display to appear fluid. Moreover, there can be many avatars of different sizes placed on the user interface resembling a mosaic or puzzle that can update as the avatars update. In some embodiments, user interface changes can cause the avatars to increase and decrease in size smoothly, which can result in an appearance that the user interface is live and/or fluid. Any possible change in the user interface that can draw attention to positive or negative changes in the scores associated with a participant are consistent with the disclosed embodiments. The embodiments are not limited to only those changes demonstrated by FIGS. 5A and 5B.

FIG. 6 is a flowchart illustrating an example method 600 for dynamic user interface gamification in conference calls. Method 600 can be performed by various devices disclosed above. For example, some embodiments of method 600 are performed by conference server 150.

Method 600 includes providing a graphical user interface (step 610) that represents a conference to a plurality of participants in the conference wherein the representation of the participants on the user interface is based on scores associated with the participants. For example, participants can connect to conference server 150 through conference bridge 110. As the participants connect, user interface server 440 can receive from scoring module 410, a score for the particular participant that can be based on the context of the conference. In this example, user interface server 440 can provide an updated graphical user interface to multimedia client devices 120.

Method 600 includes acquiring data (step 620) from participants representative of a participation level of a participant. Participants in the conference can provide explicit feedback through multimedia client devices 120 that demonstrates approval or disapproval of what is currently being presented in the conference. Moreover sensors and I/O devices (e.g., proximity sensor 214, light sensor 212, motion sensor 210, biometric sensor 218, other sensors 216, camera subsystem 220, and/or audio system 226) can monitor a participant obtaining implicitly positive or negative feedback about the conference. This feedback can be acquired and analyzed by scoring module 410, analysis module 420, and recommendation engine 430. The data from multimedia client devices 120 can be provided through conference bridge 110 and acquired by conference server 150.

Method 600 includes updating (step 630) the score associated with the participant using the acquired data. After data is acquired by scoring module 410, scoring module 410 can analyze the data and update the score of the target participant based on the feedback. For example, if implicit data demonstrates that a speaking participant caused other participants to laugh, this positive result can lead to an increase in the score for the speaking participant. Conversely, participants may explicitly downvote a speaking participant. When scoring module 410 acquires this negative data, scoring module 410 can reduce the score of the speaking participant. As previously described, the magnitude of the effect of the positive or negative feedback can be affected by the score of the source of the feedback.

Method 600 includes determining changes (step 640) to the graphical user interface based on a comparison of the scores associated with the participants. After adjusting the relevant scores, scoring module 410 can provide the updated score information to user interface server 440. User interface server 440 can compare the scores of the participants represented in the conference user interface. Based on this comparison, user interface server 440 can determine the necessary updates to the conference user interface to reflect the changes in score.

Method 600 further includes providing the changes (step 650) to the graphical user interface to the participants. After determining the changes to the user interface, user interface server 440 can distribute the changes to the user interface to the multimedia electronic devices 120 via conference bridge 110. As previously described, the changes distributed by user interface server 440 can include the entirety of the graphical user interface, only the visual changes to the graphical user interface, and/or instructions or messages that direct the multimedia electronic devices 120 to update their particular version of the conference user interface.

In the preceding description, various preferred embodiments have been described with reference to the accompanying drawings. It will, however, be evident that various modifications and changes may be made thereto, and additional embodiments may be implemented, without departing from the broader scope of the disclosure. The disclosure and drawings are accordingly to be regarded in an illustrative rather than restrictive sense.

For example, advantageous results still could be achieved if steps of the disclosed techniques were performed in a different order or if components in the disclosed systems were combined in a different manner or replaced or supplemented by other components. Therefore, it is intended that the disclosed embodiments and examples be considered as examples only.

What is claimed is:

1. A computer-implemented method for dynamically changing a conference graphical user interface comprising:
provide a graphical user interface representative of the conference in an online environment to devices associated with a plurality of participants in the conference, wherein the graphical user interface includes representations of the plurality of participants, and the representations are based on scores associated with the plurality of participants;
acquiring data from one or more of the plurality of participants representative of a participation level of a participant of the plurality of participants;
dynamically updating the scores associated with the plurality of participants using the acquired data;
analyzing the acquired data, and trained data from past conferences to correlate patterns of contribution to successful conference outcomes;
determining a first set of changes to the graphical user interface based on a comparison of the scores associated with the plurality of participants and a second set of changes to the graphical user interface, based on the analysis, wherein the second set of changes are configured to steer a pattern of the conference to patterns correlated to successful conference outcomes; and
providing the first set of changes and the second set of changes to the graphical user interface to the plurality of participants.

2. The computer implemented method of claim 1, wherein the first set of changes or the second set of changes to the graphical user interface include instructions capable of directing devices associated with the plurality of participants to update the graphical user interface displayed on the devices.

3. The computer implemented method of claim 1, wherein the first set of changes or the second set of changes to the graphical user interface include adjusting the size of one or more of the representations of the plurality of participants.

4. The computer implemented method of claim 1, wherein the first set of changes or the second set of changes to the graphical user interface include highlighting one or more of the representations of the plurality of participants.

5. The computer implemented method of claim 1, wherein the first set of changes or the second set of changes to the graphical user interface include a visual representation of an action of one or more of the plurality of participants.

6. The computer implemented method of claim 1, wherein the first set of changes or the second set of changes to the graphical user interface include a visual representation of an achievement of one or more of the plurality of participants.

7. The computer implemented method of claim 1, wherein the first set of changes or the second set of changes to the graphical user interface include a visual representation of the scores associated with the plurality of participants.

8. The computer implemented method of claim 1, wherein the first set of changes or the second set of changes to the graphical user interface include providing metrics associated with the conference.

9. The computer implemented method of claim 1, wherein the acquired data includes biometric data.

10. The computer implemented method of claim 1, wherein the acquired data includes explicit feedback from the one or more of the plurality of participants in the conference.

11. The computer implemented method of claim 1, wherein the scores associated with the plurality of participants are based on scores from at least one prior conference.

12. The computer implemented method of claim 1, wherein the scores associated with the plurality of participants are based on data sources external to the conference.

13. The computer implemented method of claim 1, further comprising:
analyzing the scores associated with the plurality of participants and acquired data;
recommending conference participants based on the analysis.

14. The computer implemented method of claim 13, wherein the analysis is further based on contextual information associated with the plurality of participants.

15. A conference server for dynamically changing a conference graphical user interface comprising:
at least one processor and at least one memory, wherein the at least one memory stores instructions that are executed by the at least one processor to:
provide, by a user interface server, a graphical user interface representative of the conference in an online environment to a plurality of devices, each device being associated with a participant of a plurality of participants in the conference, wherein the graphical user interface includes representations of the plurality of participants, and the representations are based on scores associated with the plurality of participants;
acquire, by a scoring module, data representative of a participation level of a participant of the plurality of participants from one or more of the plurality of the participant-associated user devices, wherein the scoring module dynamically updates the score associated with the participant using the acquired data, and wherein the user interface server determines a first set of changes to the graphical user interface based on a comparison of the scores associated with the plurality of participants and provides the first set of changes to the graphical user interfaces to the plurality of participant-associated user devices;
analyze, by an analysis module, the conference using the acquired data and trained data from past conferences to correlate patterns of contribution to successful conference outcomes; and
provide, by the user interface server, a second set of changes to the graphical user interface, based on the analysis, to steer a pattern of the conference to patterns correlated to successful conference outcomes.

16. The conference server of claim 15 further comprising:
analyze, using an analysis module, the scores associated with the plurality of participants and acquired data; and
recommend, by a recommendation engine, conference participants based on the analysis.

17. The conference server of claim 16, wherein the analysis is further based on contextual information associated with the participants.

18. A non-transitory computer-readable medium encoded with instructions, which when executed by a processor, cause the processor to perform a method for dynamically changing a conference graphical user interface, the method comprising:
providing a graphical user interface representative of the conference in an online environment to devices associated with a plurality of participants in the conference, wherein the graphical user interface includes representations of the plurality of participants, and the representations are based on scores associated with the plurality of participants;

acquiring data from one or more of the plurality of participants representative of a participation level of a participant of the plurality of participants;

dynamically updating the scores associated with the plurality of participants using the acquired data;

analyzing the acquired data, and trained data from past conferences to correlate patterns of contribution to successful conference outcomes;

determining a first set of changes to the graphical user interface based on a comparison of the scores associated with the plurality of participants and a second set of changes to the graphical user interface, based on the analysis, wherein the second set of changes are configured to steer a pattern of the conference to patterns correlated to successful conference outcomes; and providing the first set of changes and the second set of changes to the graphical user interface to the plurality of participants.

19. The non-transitory computer readable medium of claim 18, wherein the first set of changes or the second set of changes to the graphical user interface include instructions capable of directing devices associated with the plurality of participants to update the graphical user interface displayed on the devices.

20. The non-transitory computer readable medium of claim 18, further comprising:

analyzing the scores associated with the plurality of participants and acquired data;

recommending conference participants based on the analysis.

* * * * *